United States Patent
Jung et al.

(10) Patent No.: US 12,235,539 B2
(45) Date of Patent: Feb. 25, 2025

(54) LIQUID CRYSTAL DISPLAY APPARATUS

(71) Applicant: SAMSUNG SDI CO., LTD., Yongin-si (KR)

(72) Inventors: Yong Un Jung, Suwon-si (KR); Young Hyun Ju, Suwon-si (KR); So Yeon Gong, Suwon-si (KR); Jin Woo Kim, Suwon-si (KR); Da Neung Park, Suwon-si (KR); Young Oh, Suwon-si (KR); Dong Ho Wee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/181,370

(22) Filed: Mar. 9, 2023

(65) Prior Publication Data

US 2023/0288750 A1    Sep. 14, 2023

(30) Foreign Application Priority Data

Mar. 11, 2022   (KR) .......................... 10-2022-0031050

(51) Int. Cl.
  *G02F 1/1335*   (2006.01)
(52) U.S. Cl.
  CPC .. *G02F 1/133531* (2021.01); *G02F 1/133512* (2013.01); *G02F 1/133528* (2013.01)
(58) Field of Classification Search
  None
  See application file for complete search history.

(56) References Cited

U.S. PATENT DOCUMENTS

| | | | |
|---|---|---|---|
| 2013/0194521 A1* | 8/2013 | Whangbo | G02B 30/28 349/15 |
| 2014/0292626 A1* | 10/2014 | Park | G09G 3/3611 345/87 |

(Continued)

FOREIGN PATENT DOCUMENTS

| | | | |
|---|---|---|---|
| KR | 10-2014-0119395 A | | 10/2014 |
| KR | 10-2015-0070789 A | | 6/2015 |

(Continued)

OTHER PUBLICATIONS

Taiwanese Office Action dated Mar. 27, 2024, issued in corresponding Taiwanese Patent Application No. 112108945 (11 pages).

(Continued)

*Primary Examiner* — Shan Liu
(74) *Attorney, Agent, or Firm* — Lewis Roca Rothgerber Christie LLP

(57) ABSTRACT

A liquid crystal display apparatus includes: a liquid crystal panel; and a viewer-side polarizing plate stacked on a light exit surface of the liquid crystal panel, and the viewer-side polarizing plate includes a patterned layer including a first resin layer and a second resin layer having different indexes of refraction; and a patterned portion including multiple engraved optical patterns and a flat section between adjacent engraved optical patterns of the multiple optical patterns is formed at an interface between the first resin layer and the second resin layer, and the liquid crystal display apparatus satisfies Equation 1 herein and the engraved optical patterns have an aspect ratio of 0.3 or more.

12 Claims, 6 Drawing Sheets

(56) References Cited

U.S. PATENT DOCUMENTS

| | | | |
|---|---|---|---|
| 2015/0168792 A1* | 6/2015 | Woo | G02F 1/1333 |
| | | | 349/110 |
| 2015/0227004 A1* | 8/2015 | Cho | G02F 1/133707 |
| | | | 349/110 |
| 2016/0252665 A1* | 9/2016 | Lee | G02B 5/3083 |
| | | | 359/489.07 |
| 2018/0196172 A1* | 7/2018 | Shim | G02F 1/133504 |
| 2019/0025634 A1* | 1/2019 | Park | G02F 1/133516 |
| 2019/0087044 A1* | 3/2019 | Cho | H10K 59/12 |
| 2019/0163023 A1* | 5/2019 | Park | G02F 1/133617 |
| 2020/0117046 A1 | 4/2020 | Hwang et al. | |
| 2022/0365258 A1 | 11/2022 | Shim et al. | |

FOREIGN PATENT DOCUMENTS

| | | |
|---|---|---|
| KR | 10-2015-0095976 A | 8/2015 |
| KR | 10-2018-0047569 A | 5/2018 |
| KR | 10-2018-0082028 A | 7/2018 |
| KR | 10-2019-0062647 A | 6/2019 |
| KR | 10-2020-0040980 A | 4/2020 |
| TW | 202011062 A | 3/2020 |

OTHER PUBLICATIONS

Korean Office Action dated Jul. 8, 2024, issued in corresponding Korean Patent Application No. 10-2022-0031050 (8 pages).

* cited by examiner

LIQUID CRYSTAL DISPLAY APPARATUS

CROSS-REFERENCE TO RELATED APPLICATION

This application claims priority to and the benefit of Korean Patent Application No. 10-2022-0031050, filed on Mar. 11, 2022 in the Korean Intellectual Property Office, the entire disclosure of which is incorporated herein by reference.

BACKGROUND

1. Field

Aspects of embodiments of the present invention relate to a liquid crystal display apparatus.

2. Description of the Related Art

In operation of a liquid crystal display apparatus, light emitted from a backlight unit is discharged through a liquid crystal panel. Accordingly, a screen of the liquid crystal display apparatus has a good contrast ratio (CR) at a front side thereof. However, the screen of the liquid crystal display apparatus has a lower contrast ratio at a lateral side than at the front side. Thus, it is suggested to apply a film formed with a patterned portion having a predetermined pattern to a viewer-side polarizing plate to improve contrast ratio and viewing angle.

The patterned portion can provide an effect of improving contrast ratio and viewing angle at a lateral side. In the liquid crystal display apparatus, a liquid crystal panel includes multiple fine unit pixels including red pixels, green pixels, and blue pixels in a color filter. However, the inventors of the present invention confirmed that such pixels can generate Moiré and rainbow spots together with the patterned portion upon operation of the display apparatus.

The background technique of the present invention is disclosed in Korean Patent Laid-open Publication No. 2018-0047569 and the like.

SUMMARY

According to an aspect of embodiments of the present invention, a liquid crystal display apparatus that has good diagonal contrast ratio in an operation state and prevents or substantially prevents generation of Moiré and rainbow spots to ensure good external appearance is provided.

Aspects of one or more embodiments of the present invention relate to a liquid crystal display apparatus.

According to one or more embodiments, a liquid crystal display apparatus includes: a liquid crystal panel; and a viewer-side polarizing plate stacked on a light exit surface of the liquid crystal panel, wherein the viewer-side polarizing plate includes a patterned layer including a first resin layer and a second resin layer having different indexes of refraction; and a patterned portion including multiple engraved optical patterns and a flat section formed between adjacent engraved optical patterns is formed at an interface between the first resin layer and the second resin layer; and wherein the liquid crystal display apparatus satisfies the following Equation 1 and the engraved optical patterns have an aspect ratio of 0.3 or more:

$$7 \leq P2/P1 \leq 85, \quad \text{Equation 1}$$

where P1 is a pitch (unit: μm) of the patterned portion, and P2 is a width (unit: μm) of a pixel of the liquid crystal panel in a same direction as a maximum width of the engraved optical patterns.

In one or more embodiments, the engraved optical patterns may be arranged in a same direction as a short-side direction of the liquid crystal panel.

In one or more embodiments, in Equation 1, P2 may be the sum of a width of one unit pixel of one pixel in a longitudinal direction of the unit pixel and a width of one black matrix in a longitudinal direction thereof.

In one or more embodiments, the engraved optical patterns may be arranged in a same direction as a long-side direction of the liquid crystal panel.

In one or more embodiments, in Equation 1, P2 may be the sum of the sum of widths of unit pixels of one pixel in a transverse direction of each unit pixel and widths of three black matrixes in a transverse direction thereof.

In one or more embodiments, the pixel may be a pixel assembly including three unit pixels consisting of a red unit pixel, a green unit pixel, and a blue unit pixel, and black matrixes each separating a corresponding unit pixel from other unit pixels.

In one or more embodiments, the liquid crystal panel may include multiple pixels arranged in a long-side direction and a short-side direction of the liquid crystal panel, respectively, such that a red unit pixel, a green unit pixel, and a blue unit pixel are repeatedly arranged in the stated order in the long-side direction, and red unit pixels, green unit pixels, or blue unit pixels are arranged alone in the short-side direction.

In one or more embodiments, in Equation 1, P1 may be from 7 μm to 50 μm, and P2 may be from 50 μm to 1,000 μm.

In one or more embodiments, the engraved optical patterns may be arranged in a same direction as a light absorption axis of the polarizer.

In one or more embodiments, the engraved optical patterns may have an N-gonal cross-section, N being an integer of 3 to 10, or a cross-section having a curved side surface.

In one or more embodiments, the maximum width of the engraved optical patterns may be from 30% to less than 100% of the pitch of the patterned portion.

In one or more embodiments, the patterned portion may have a constant P1 and the engraved optical patterns may have a same maximum width.

Aspects of embodiments of the present invention provide a liquid crystal display apparatus that has good diagonal contrast ratio in an operation state and prevents or substantially prevents generation of Moiré and rainbow spots to ensure good external appearance.

DETAILED DESCRIPTION

Figure 1:
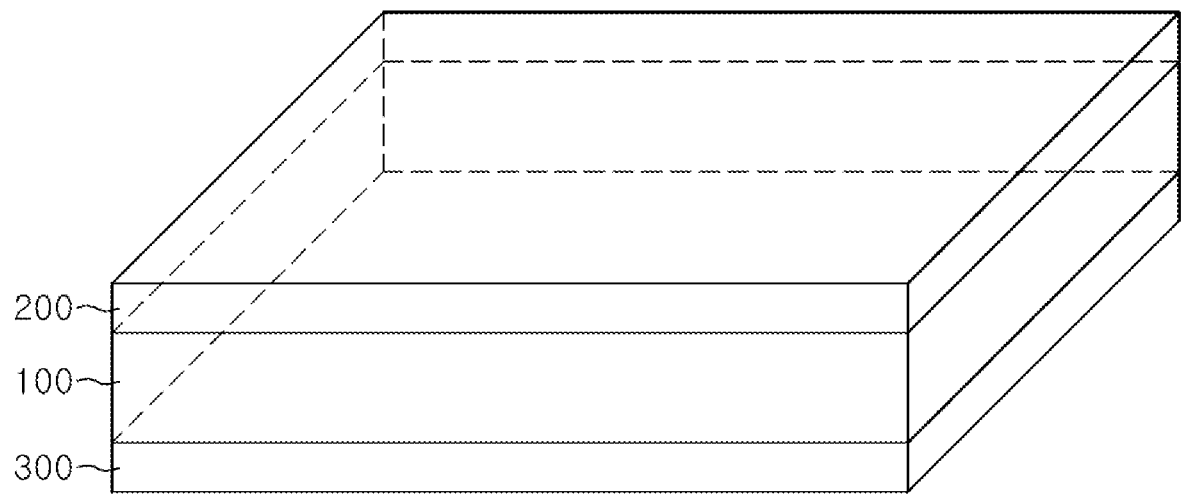
FIG. 1 is a partial perspective view of a liquid crystal display apparatus according to an embodiment of the present invention.

Herein, some embodiments of the present invention will be described in further detail with reference to the accompanying drawings such that the present invention may be easily implemented by those skilled in the art. It is to be understood that the present invention may be embodied in different ways and is not limited to the following embodiments.

In the drawings, components unrelated to the description may be omitted for clear description of the invention, and like components will be denoted by like reference numerals throughout the specification.

Herein, spatially relative terms, such as "upper" and "lower," are defined with reference to the accompanying drawings. Thus, it is to be understood that "upper surface" can be used interchangeably with "lower surface," and when an element is referred to as being placed "on" another element, it may be directly placed on the other element, or one or more intervening elements may be present. When an element is referred to as being placed "directly on" another element, there are no intervening element(s) therebetween.

Herein, "in-plane retardation (Re)" is a value measured at a wavelength of 550 nm, as calculated according to the following Equation A:

$$Re = (nx - ny) \times d, \quad (A)$$

where nx and ny are the indexes of refraction of a protective layer in the slow axis direction and the fast axis direction thereof at a wavelength of 550 nm, respectively, and d is the thickness (unit: nm) of the protective layer.

Herein, "(meth)acryl" refers to acryl and/or methacryl.

As used herein to represent a specific numerical range, "X to Y" means "X≤and ≤Y".

A liquid crystal display apparatus according to one or more embodiments of the present invention includes: a liquid crystal panel; and a viewer-side polarizing plate stacked on a light exit surface of the liquid crystal panel, wherein the viewer-side polarizing plate includes a patterned layer including a first resin layer and a second resin layer having different indexes of refraction from each other; and a patterned portion including multiple engraved optical patterns and a flat section between adjacent engraved optical patterns of the multiple optical patterns is formed at an interface between the first resin layer and the second resin layer, and wherein the liquid crystal display apparatus satisfies the following Equation 1, and the engraved optical patterns have an aspect ratio of 0.3 or more.

$$7 \leq P2/P1 \leq 85, \quad \text{Equation 1}$$

where P1 is a pitch (unit: μm) of the patterned portion, and P2 is a width (unit: μm) of one pixel of the liquid crystal panel in a same direction as a maximum width of the engraved optical patterns.

According to embodiments of the present invention, in the liquid crystal display apparatus including the viewer-side polarizing plate having the patterned portion, among several elements of the patterned portion and several elements of the pixel assembly in the liquid crystal panel, a ratio of widths in a certain direction of a pixel in a liquid crystal panel to the pitch of the patterned portion is adjusted to a certain ratio, thereby securing a good diagonal contrast ratio while preventing or substantially preventing generation of Moiré and rainbow spots caused by lamination of the patterned portion and the pixel, thus securing good external appearance. If only the width of the engraved optical pattern in the patterned portion is adjusted, there may be a problem of poor patterning processing or formation or a failure in achievement in target diagonal contrast ratio. If only the width of the pixel is adjusted, there may be a problem of insufficient resolution or high power consumption due to a low opening ratio.

If P2/P1 is less than 7, there may be a problem of observation of Moiré. If P2/P1 exceeds 85, there may be a problem of observation of rainbow spots or difficulty in formation of a patterned layer in the viewer-side polarizing plate, thereby making it difficult to achieve target lateral contrast ratio. For example, the liquid crystal display apparatus may have a P2/P1 value of 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85. In an embodiment, the liquid crystal display apparatus has a P2/P1 value of 8 to 30, and, in an embodiment, 10 to 30.

Herein, a liquid crystal display apparatus according to an embodiment of the present invention will be described with reference to FIG. 1 to FIG. 6B.

The liquid crystal display apparatus includes a liquid crystal panel 100, a viewer-side polarizing plate 200, and a light source-side polarizing plate 300.

Liquid Crystal Panel

The liquid crystal panel 100 includes a light incidence surface and a light exit surface facing away from each other. The light incidence surface refers to a plane through which light (internal light) emitted from a light source (not shown in FIG. 1) disposed under a lower surface of the light source-side polarizing plate 300 enters the liquid crystal panel. The light exit surface refers to a plane through which light having entered the liquid crystal panel is discharged towards the viewer-side polarizing plate 200.

In an embodiment, the liquid crystal panel 100 has a rectangular shape composed of long sides corresponding to a horizontal direction and short sides corresponding to a vertical direction.

The liquid crystal panel 100 may include an upper transparent substrate, a lower transparent substrate, and a liquid crystal layer (not shown in FIG. 1) interposed between the upper transparent substrate and the lower transparent substrate. For example, the liquid crystals may include at least one selected from among a vertical alignment (VA) mode, an in-plane switching (IPS) mode, a twisted nematic (TN) mode, a fringe field switching (FFS) mode, a patterned vertical alignment (PVA) mode, and a S-PVA (super-patterned vertical alignment) mode, without being limited thereto.

The liquid crystal panel 100 may include a color filter and a TFT filter formed on one of the upper transparent substrate and the lower transparent substrate and facing each other. The color filter may be provided with multiple pixels, and each of the multiple pixels includes multiple unit pixels to improve contrast ratio of light. In an embodiment, the color filter may be disposed on an upper surface of the liquid crystal layer in the liquid crystal panel.

Figure 2:
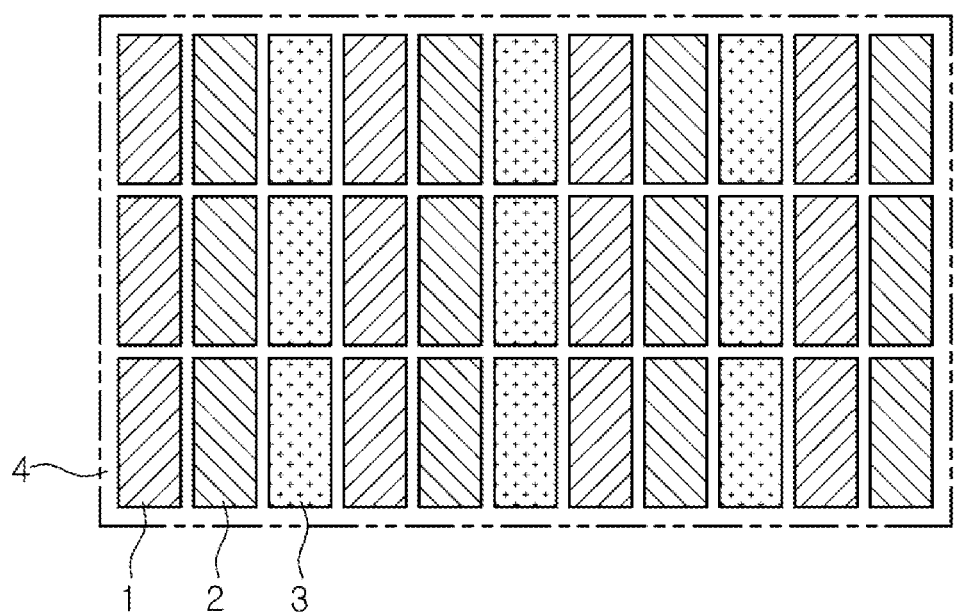
FIG. 2 is a partial plan view of a color filter.

In the color filter, the multiple pixels are arranged in the long-side direction and the short-side direction of the liquid crystal panel, respectively. Referring to FIG. 2, the pixel will be described in further detail.

Herein, referring to FIG. 2, "one pixel" is defined as a pixel assembly including a total of three unit pixels consisting of a red unit pixel 1, a green unit pixel 2, and a blue unit pixel 3, and black matrixes 4 each separating the unit pixels from one another. In an embodiment, each of the pixels may have a square or rectangular shape. In one pixel, the unit pixels are arranged in a direction and have a same size and a same shape.

As shown in FIG. 2, in the color filter, the multiple pixels may be arranged in the long-side direction and the short-side direction of the liquid crystal panel, respectively, such that the red unit pixel 1, the green unit pixel 2, and the blue unit pixel 3 are repeatedly arranged in the stated order in the long-side direction, and the red unit pixels 1, the green unit pixels 2, or the blue unit pixels 3 are arranged alone in the short-side direction.

Figure 3:
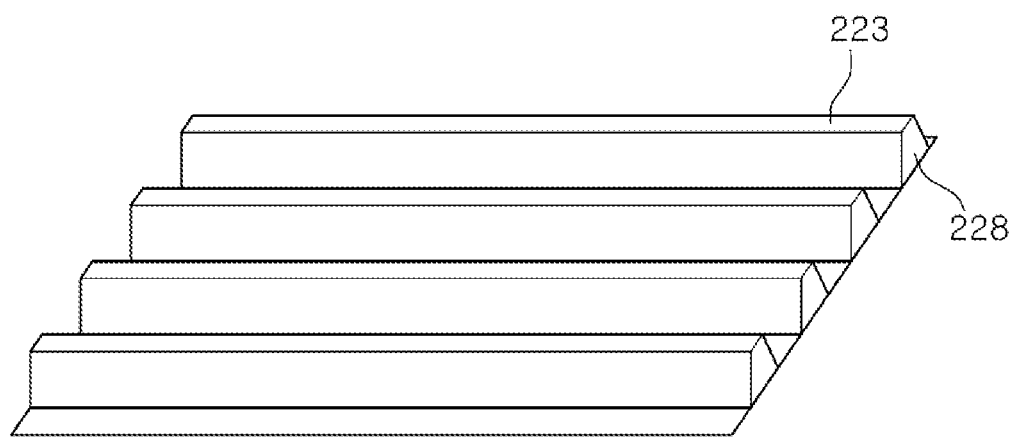
FIG. 3 is a conceptual view illustrating P2 according to an embodiment of the present invention.
Figure 3:
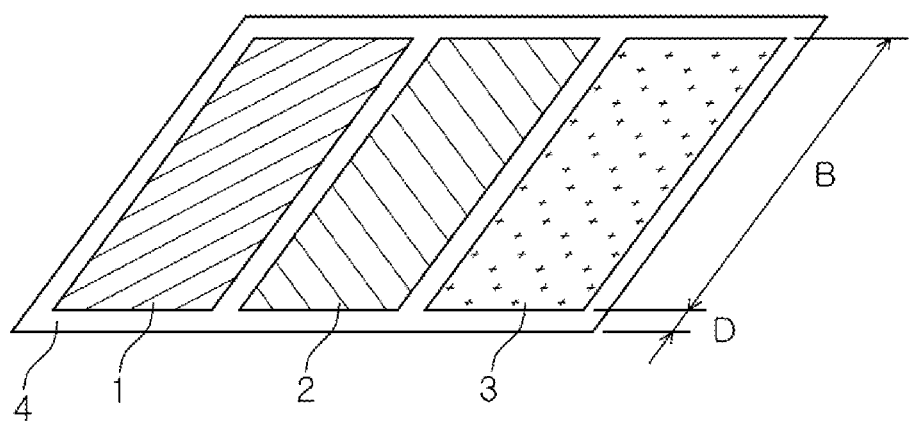

When the direction of the maximum width of the engraved optical patterns of the patterned portion in the viewer-side polarizing plate is the short-side direction of the liquid crystal panel, as shown in FIG. 3, P2 of Equation 1 is defined as the sum (B+D) of a width of any one unit pixel of one pixel in the longitudinal direction of the unit pixel and a width of one black matrix in the longitudinal direction thereof. In an embodiment, P2 may be in a range from 50 μm to 1,000 μm, for example, 50 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, or 1,000 μm, and, in an embodiment, 150 μm to 950 μm, and, in an embodiment, 150 μm to 500 μm. Within this range, the liquid crystal display apparatus can easily reach P2/P1 of Equation 1 according to the present invention.

Figure 4:
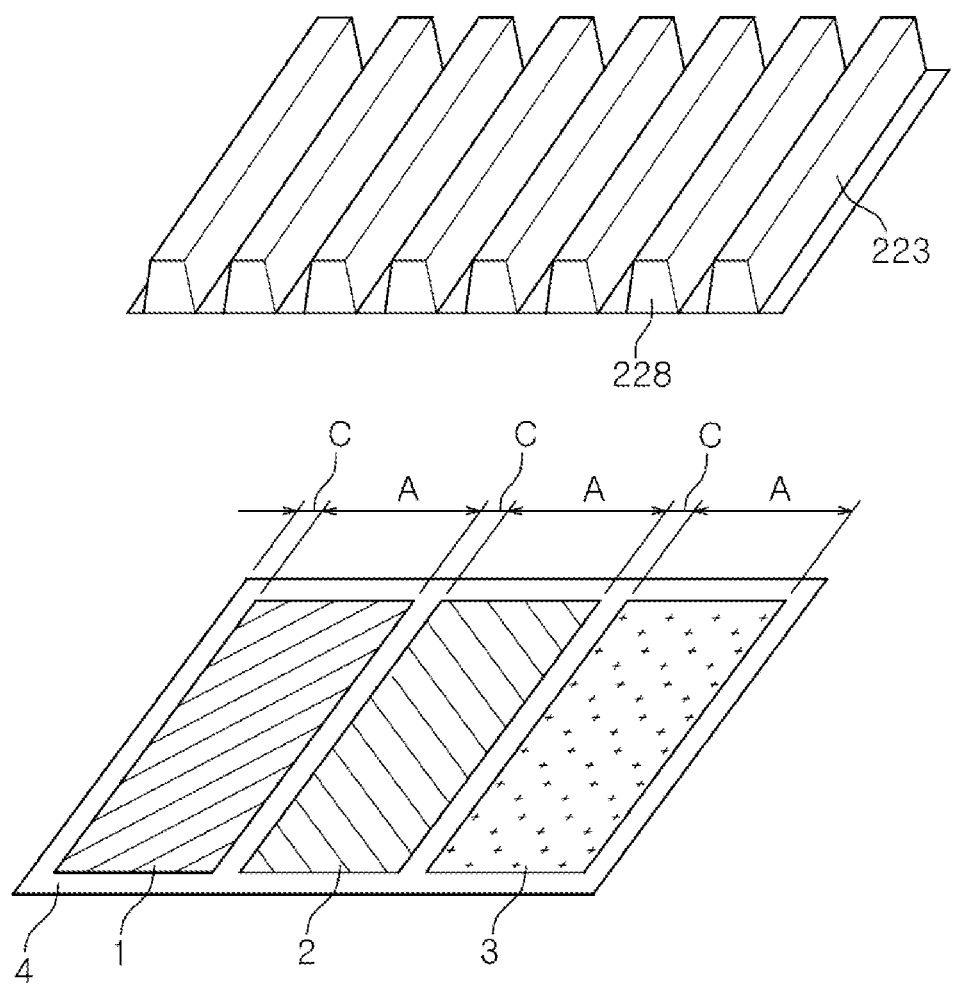
FIG. 4 is a conceptual view illustrating P2 according to an embodiment of the present invention.

When the direction of the maximum width of the engraved optical patterns of the patterned portion in the viewer-side polarizing plate is the long-side direction of the liquid crystal panel as shown in FIG. 4, P2 is defined as the sum (3A+3C) of widths of three unit pixels of one pixel in the transverse direction of each unit pixel and widths of three black matrixes in the transverse direction thereof. In an embodiment, P2 may be in a range from 50 μm to 1,000 μm, for example, 50 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, or 1,000 μm, and, in an embodiment, 150 μm to 950 μm, and, in an embodiment, 150 μm to 500 μm. Within this range, the liquid crystal display apparatus can easily reach P2/P1 of Equation 1 according to the present invention.

In the one pixel, each of the unit pixels may have a transverse width A of 10 μm to 300 μm, for example, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, or 300 μm, and, in an embodiment, 20 μm to 200 μm, and a longitudinal width B greater than the transverse width A and in a range of 50 μm to 900 μm, for example, 50 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, or 900 μm, and, in an embodiment, 80 μm to 500 μm; and each of the black matrixes may have a transverse width C or a longitudinal width D of 2 μm to 100 μm, for example, 2 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, or 100 μm, and, in an embodiment, 4 μm to 80 μm.

In an embodiment, the liquid crystal panel 100 has the same, or a constant, P2 value.

Viewer-Side Polarizing Plate

The viewer-side polarizing plate 200 may be stacked on the light exit surface of the liquid crystal panel 100 to discharge light received from the liquid crystal panel while remarkably improving contrast ratios at a front side and in a diagonal direction.

The viewer-side polarizing plate 200 includes a polarizer 210, a patterned layer 220, and a protective layer 230.

The patterned layer 220 may be stacked on a light exit surface of the polarizer 210 or on a light incidence surface thereof. In an embodiment, the patterned layer 220 is stacked on the light exit surface of the polarizer 210. Here, "light exit surface" is a plane through which light (internal light) emitted from the light source (not shown in FIG. 1) is discharged from the polarizer 210. In addition, "light incidence surface" is a plane through which light emitted from the liquid crystal panel 100 enters the polarizer 210.

The patterned layer 220 has a first resin layer 221 and a second resin layer 222 having different indexes of refraction from each other. In the polarizing plate, the first resin layer 221 and the second resin layer 222 are sequentially stacked on the polarizer 210.

A patterned portion is formed at an interface between the first resin layer 221 and the second resin layer 222. The patterned portion may include engraved optical patterns 223 having a certain cross-section (e.g., a predetermined cross-section) and a flat section 224 formed between adjacent engraved optical patterns 223.

P1 is defined as the sum W+L of the maximum width W of one engraved optical pattern and the maximum width L of the flat section between adjacent engraved optical patterns. In an embodiment, P1 may be in a range from 7 μm to 50 μm, for example, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm, and, in an embodiment, 11 μm to 34 μm. Within this range, the liquid crystal display apparatus can easily reach P2/P1 of Equation 1 according to the present invention.

In an embodiment, the patterned portion may have the same, or a constant, P1 value.

In an embodiment, each of the engraved optical patterns 223 may have a stripe shape, and multiple engraved optical patterns 223 may be arranged in a direction with respect to the liquid crystal panel 100.

In an embodiment, the engraved optical patterns may be arranged in the same direction as the short-side direction of the liquid crystal panel, as shown in FIG. 3. Here, the direction of the maximum width of the engraved optical patterns may be the same as the longitudinal direction of each unit pixel in the one pixel.

In another embodiment, the engraved optical patterns may be arranged in the same direction as the long-side direction of liquid crystal panel, as shown in FIG. 4. Here, the direction of the maximum width of the engraved optical patterns may be the same as the transverse direction of each unit pixel in the one pixel.

In an embodiment, the patterned portion may satisfy the following Equation 2, and the engraved optical patterns 223 may have a base angle θ of 75° to 90°. Within this range, the patterned portion can improve diagonal contrast ratio through suppression of light leakage in the diagonal direction while minimizing or reducing loss of front luminance and can reduce difference between front contrast ratio and diagonal contrast ratio.

$$1 < P1/W \leq 10, \qquad \text{Equation 2}$$

where P1 is the pitch of the patterned portion (unit: μm), and W is the maximum width of the engraved patterns (unit: μm).

The base angle θ means an angle defined between a portion of a side surface of the engraved optical pattern 223 directly connected to the maximum width W of the engraved optical pattern 223 and the maximum width W of the engraved optical pattern 223. In an embodiment, the base angle θ is in a range from 80° to 90° and P1/W of Equation 2 is in a range from 1.2 to 8.

The engraved optical pattern 223 may be an optical pattern protruding from the first resin layer 221 towards the second resin layer 222.

In an embodiment, the engraved optical patterns 223 has an aspect ratio (ratio of the maximum height H to the maximum width W) of 0.3 or more. Within this range, the engraved optical patterns 223 can assist in improvement in diagonal contrast ratio. For example, the engraved optical patterns 223 may have an aspect ratio of 0.3, 0.4, 0.5, 0.6, 0.7, 0.8, 0.9, 1, 1.1, 1.2, 1.3, 1.4, 1.5, 1.6, 1.7, 1.8, 1.9, or 2, and, in an embodiment, 0.6 or more, and, in an embodiment, 0.6 to 3, and, in an embodiment, 1.1 to 2.

In an embodiment, the maximum width W of the engraved optical patterns 223 may be in a range from 30% to less than 100%, for example, 30%, 35%, 40%, 45%, 50%, 55%, 60%, 65%, 70%, 75%, 80%, 85%, 90%, 95%, or 99%, and, in an embodiment, 35% to 70%, and, in an embodiment, 50% to 70%, of the pitch P1 of the patterned portion. Within this range, the liquid crystal display apparatus can suppress visualization of Moiré and rainbow spots.

In an embodiment, the engraved optical patterns 223 may have a maximum width W of 3 μm to 50 μm, for example, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm, and, in an embodiment, 5 μm to 30 μm, and, in an embodiment, 5 μm to 20 μm, and a maximum height H of 3 μm to 50 μm, for example, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm, and, in an embodiment, 5 μm to 30 μm, and, in an embodiment, 5 μm to 20 μm. Within this range, the liquid crystal display apparatus can easily reach the aspect ratio of the present invention while improving the diagonal contrast ratio.

In an embodiment, the engraved optical patterns may have the same maximum width W between adjacent engraved optical patterns and the same maximum height H between adjacent engraved optical patterns. In an embodiment, the engraved optical patterns may have the same maximum height H in the longitudinal direction thereof.

The engraved optical patterns 223 may have a first surface 225 formed at a top portion thereof and both side surfaces (a first side surface 226 and a second side surface 227) connected to the first surface 225.

The first surface 225 is formed at the top portion of the engraved optical pattern 223 and emits light received from the engraved optical patterns 223, thereby improving luminance of the liquid crystal display apparatus. The first surface 225 may be a generally flat surface. In an embodiment, the first surface 225 may have a maximum width of 3 μm to 45 μm, and, in an embodiment, 5 μm to 30 μm. Within this range, the liquid crystal display apparatus can easily reach the aspect ratio of the present invention while improving the diagonal contrast ratio.

Each of the first side surface 226 and the second side surface 227 may be composed of one or more flat surfaces, for example, one to three flat surfaces.

Figure 5:
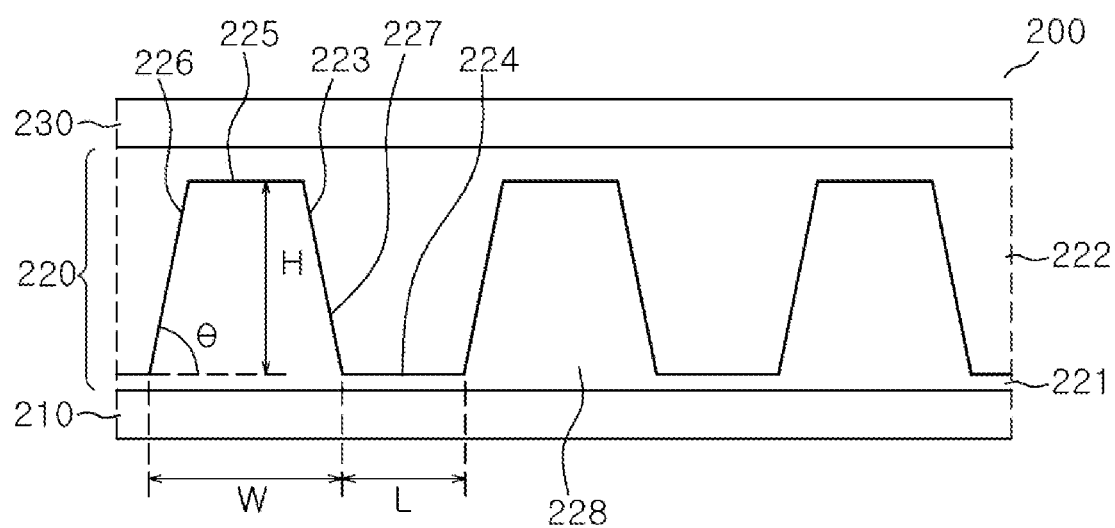
FIG. 5 is a partial cross-sectional view of a viewer-side polarizing plate.

In an embodiment, each of the first side surface 226 and the second side surface 227 may be composed of one flat surface, as shown in FIG. 5.

Figure 6A:
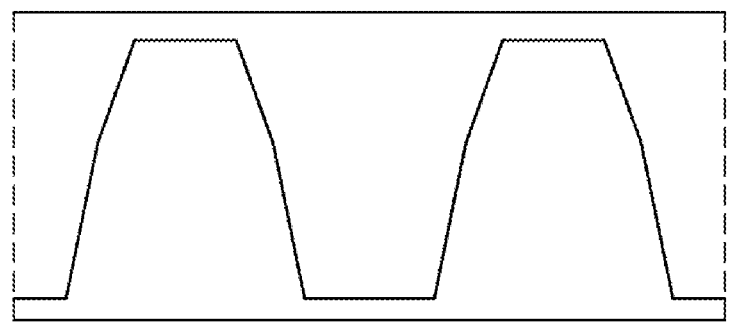
FIGS. 6A and 6B are cross-sectional views of some engraved optical patterns.
Figure 6B:
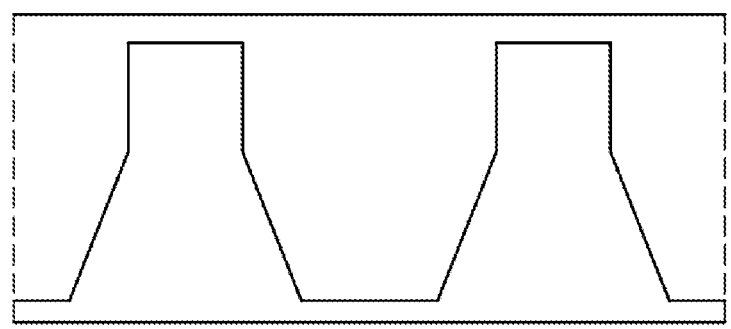

In another embodiment, each of the first and second side surfaces may be composed of two or more flat surfaces, as shown in FIGS. 6A and 6B, in which each of the flat surfaces may have different base angles θ. Here, the base angle θ means an angle defined between a portion of a side surface of the engraved optical pattern directly connected to the maximum width W of the engraved optical pattern and the maximum width W of the engraved optical pattern. Each of the side surfaces may be a convex polygonal surface (see FIG. 6A) that protrudes from the first resin layer to the second resin layer or a concave polygonal surface (see FIG. 6B) that protrudes from the second resin layer to the first resin layer. In an embodiment, the base angle θ may be in a range from 60° to 90°, for example, 75° to 90°. Within this range, the liquid crystal display apparatus can easily realize the effects of the present invention.

For example, the optical patterns may have an N-gonal cross-section (N being an integer of 3 to 10), such as a trapezoidal cross-section, a rectangular cross-section, or a square cross-section Each of the side surfaces may be composed of one or more curved surfaces, for example, one to three curved surfaces.

In an embodiment, each of the side surfaces may be composed of one curved surface. In another embodiment, each of the side surfaces may be composed of two or more curved surfaces, in which the curved surfaces may have different base angles θ with respect to the maximum width of the engraved optical pattern. Here, the base angle θ means an angle defined between a tangential line (T) of the corresponding curved surface at a half point of the maximum height of the engraved optical pattern and the maximum width W thereof.

Here, each of the side surfaces may be a convexly curved surface that protrudes from the first resin layer to the second resin layer or a concavely curved surface that protrudes from the second resin layer to the first resin layer. In an embodiment, the base angle may be in a range from 60° to 90°, for example, 75° to 90°. Within this range, the liquid crystal display apparatus can easily realize the effects of the present invention.

Adjacent engraved optical patterns 223 may be spaced apart from each other by the flat section 224. The flat section 224 allows light vertically received from the polarizer to pass therethrough, thereby improving luminance. In an embodiment, the maximum width L of the flat section 224 may be greater than 0 μm to 40 μm, for example, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, or 40 μm, and, in an embodiment, 3 μm to 25 μm, and, in an embodiment, 4 μm to 20 μm. Within this range, the engraved optical patterns 223 can improve the diagonal contrast ratio while reducing difference between front contrast ratio and diagonal contrast ratio.

The first resin layer 221 may be formed with a filling pattern 228 that fills at least part of the engraved optical pattern 223.

The second resin layer 222 may have a higher or lower index of refraction than the first resin layer 221. In an embodiment, the second resin layer 222 has a higher index of refraction than the first resin layer 221 to secure further improvement in visibility.

In an embodiment, a difference in index of refraction between the first resin layer 221 and the second resin layer 222 may be 0.2 or less, for example, 0.1 to 0.2. Within this range, the patterned layer can assist in improvement in diagonal contrast ratio. In an embodiment, the first resin layer 221 may have an index of refraction of less than 1.53, for example, 1.30 to less than 1.53, and the second resin layer 222 may have an index of refraction of 1.53 or more, for example, 1.53 to 1.70.

The polarizer 210 may have an in-plane light absorption axis and a light transmission axis and may emit polarized light to the patterned layer through polarization of light received from the liquid crystal panel. The light absorption axis corresponds to the machine direction (MD) of the polarizer 210 and the light transmission axis corresponds to the transverse direction (TD) of the polarizer 210.

In an embodiment, the engraved optical patterns may be arranged in the same direction as the light absorption axis of the polarizer 210. For example, assuming that the light absorption axis of the polarizer is aligned in a direction of 0°, the longitudinal direction of the engraved optical patterns may be inclined at an angle of −5 to 5°, −1 to 1°, or 0° with respect to the light absorption axis of the polarizer 210.

In an embodiment, the polarizer 210 may include a polyvinyl alcohol-based polarizer formed by uniaxially stretching a polyvinyl alcohol film or a polyene-based polarizer formed through dehydration of the polyvinyl alcohol film. The polarizer 210 may be manufactured using a polyvinyl alcohol film by a typical method known to those skilled in the art.

In an embodiment, the polarizer 210 may have a thickness of 5 μm to 40 μm. Within this range, the polarizer 210 can be used in an optical display.

The protective layer 230 is a light transmissive layer and may transmit light spreading through the patterned layer.

The protective layer 230 may be a retardation film or an isotropic film providing a certain range (e.g., a predetermined range) of phase difference. In an embodiment, the protective layer 230 may have an in-plane retardation Re of 8,000 nm or more, and, in an embodiment, 10,000 nm or more, and, in an embodiment, greater than 10,000 nm, and, in an embodiment, 10,100 nm to 15,000 nm. Within this range, the protective layer 230 can prevent or substantially prevent observation of rainbow spots and can further improve an effect of spreading light having passed through the second resin layer 222 and the first resin layer 221. In another embodiment, the protective layer 230 may be an isotropic film having an in-plane retardation Re of 60 nm or less, and, in an embodiment, 0 nm to 60 nm, and, in an embodiment, 40 nm to 60 nm. Within this range, the protective layer 230 can improve image quality through compensation of viewing angle. Here, the isotropic film means a film, all of nx, ny, and nz of which have substantially the same values, and "substantially the same" means not only a case in which the retardation values are completely the same, but also a case in which there is a slight difference therebetween. In an embodiment, the protective layer 230 has an in-plane retardation Re of 8,000 nm or more, and, in an embodiment, 10,000 nm or more, and, in an embodiment, greater than 10,000 nm.

In an embodiment, the protective layer 230 may have a thickness of 30 μm to 120 μm, and, in an embodiment, 20 μm to 80 μm. Within this range, the protective layer 230 can be applied to an optical display. In an embodiment, the protective layer 230 may have a light transmittance of 80% or more, and, in an embodiment, 85% to 95%, in the visible spectrum. The protective layer 230 may include a film prepared by monoaxially or biaxially stretching an optically transparent resin. In an embodiment, the resin may include at least one selected from among polyesters including polyethylene terephthalate (PET), polybutylene terephthalate, polyethylene naphthalate, polybutylene naphthalate, and the like, cellulose esters including acryl, cyclic olefin polymers (COP), triacetyl cellulose (TAC), and the like, polyvinyl acetate, polyvinyl chloride (PVC), polynorbornene, polycarbonate (PC), polyamide, polyacetal, polyphenylene ether, polyphenylene sulfide, polysulfone, polyether sulfone, polyarylate, and polyimide. In an embodiment, the protective layer 230 includes a film formed of a polyester resin. The protective layer 230 may include a film manufactured through modification of the above resin. Modification may include copolymerization, branching, cross-linking, or modification of molecular terminals.

Although not shown in FIG. 1, a functional coating layer may be further formed on at least one surface of the protective layer 230 to provide additional functions. The functional coating layer may be a primer layer, a hard coating layer, or an anti-fingerprint layer, without being limited thereto.

Light Source-Side Polarizing Plate

The light source-side polarizing plate 300 may include a polarizer and a protective layer stacked on at least one surface of the polarizer. In an embodiment, the polarizer may be substantially the same as the polarizer of the viewer-side polarizing plate. In an embodiment, the protective layer may be substantially the same as the protective layer of the viewer-side polarizing plate.

Although not shown in FIG. 1, any of a reflective prism sheet, a diffusive sheet, and the like may be further disposed between the light source-side polarizing plate 300 and the liquid crystal panel 100 to improve luminance.

Next, the present invention will be described in further detail with reference to some examples. However, these examples are provided for illustration and should not be construed in any way as limiting the invention.

Example 1

(1) Preparation of Viewer-Side Polarizing Plate

A polyethylene terephthalate (PET) film (TA-053, Toyobo) was prepared. A second resin layer composition (SSC-6030, Shin-A T&C) was coated to a predetermined thickness on a lower surface of the PET film to form a coating layer, and an optical pattern and a flat section were formed on the coating layer and the coating layer was cured to form a second resin layer. A first resin layer composition (SSC-4560, Shin-A T&C) was coated on a surface of the second resin layer having the optical pattern and the flat section, and was cured to form a first resin layer, thereby forming a patterned layer having specifications as listed in Table 1.

A polarizer (thickness: 13 μm) was prepared by stretching a polyvinyl alcohol film to 3 times an initial length thereof at 60° C. and dyeing the film with iodine, followed by stretching the dyed film to 2.5 times in an aqueous solution of boric acid at 40° C.

The patterned layer was attached to an upper surface of the polarizer such that the first resin layer and the second resin layer could be sequentially stacked in the stated order from the polarizer, and a cyclic olefin polymer (COP) film (ZEON) was bonded to a lower surface of the polarizer, thereby preparing a polarizing plate having a stacking sequence of the PET film/patterned layer (index of refraction of the second resin layer: 1.62, index of refraction of the first resin layer: 1.47)/polarizer/COP film.

(2) Preparation of Light Source-Side Polarizing Plate

A polarizer and a polarizing plate having a stacking sequence of the PET film/polarizer/COP film were sequentially prepared with reference to (1).

(3) Preparation of Module for Liquid Crystal Display Apparatus

A module was manufactured by attaching a viewer-side polarizing plate and a light source-side polarizing plate to a light exit surface and a light incidence surface of a liquid crystal panel having a liquid crystal layer (VA liquid crystals). Here, an arrangement direction of engraved optical patterns and an arrangement direction of a pixel assembly in the viewer-side polarizing plate were adjusted together with a pitch (P1) of the engraved optical patterns and a pitch (P2) of the pixel assembly, as shown in Table 1.

Examples 2 to 5

Modules were manufactured in the same manner as in Example 1 except that P1, P2, P2/P1, and the arrangement directions were changed as listed in Table 1.

Comparative Examples 1 to 3

Modules were manufactured in the same manner as in Example 1 except that P1, P2, P2/P1, and the arrangement directions were changed as listed in Table 1.

Comparative Example 4

A module was manufactured in the same manner as in Example 1 except that the engraved optical patterns and the pixel assembly were changed as listed in Table 1.

Each of the modules prepared in the Examples and Comparative Examples was evaluated as to the properties listed in Table 1 and evaluation results are shown in Table 1.

(1) Moiré: the presence of Moiré was evaluated with the naked eye. No Moiré was rated as 0 and the presence of Moiré was rated as levels 1 to 4. A level of 0 or 1 was rated as ◉, a level of 2 was rated as ○, and a level of 3 or 4 was rated as X.

(2) Rainbow: the presence of rainbow was evaluated with the naked eye. No rainbow was rated as 0 and the presence of rainbow was rated as levels 1 to 5. A level of 0 or 1 was rated as ◉, a level of 2 was rated as ○, a level of 3 was rated as A, and a level of 4 or 5 was rated as X.

(3) Relative diagonal contrast ratio: luminance of a liquid crystal display apparatus was measured at diagonal angles ($\phi=45°$, $\theta=60°$) in the spherical coordinate system in a white mode and in a black mode using an EZCONTRAST X88RC (EZXL-176R-F422A4, ELDIM). A diagonal contrast ratio was calculated according to the equation: (diagonal luminance in white mode)/(diagonal luminance in black mode), and, assuming that a liquid crystal display apparatus not including a patterned portion has a diagonal contrast ratio of 100%, a diagonal contrast ratio of 120% or more was rated as ○, and a diagonal contrast ratio of less than 120% was rated as X.

TABLE 1

| | | Example | | | | | Comparative Example | | | |
|---|---|---|---|---|---|---|---|---|---|---|
| | | 1 | 2 | 3 | 4 | 5 | 1 | 2 | 3 | 4 |
| Arrangement direction | | FIG. 3 | FIG. 4 | FIG. 4 | FIG. 4 | FIG. 4 | FIG. 3 | FIG. 4 | FIG. 4 | FIG. 3 |
| Patterned portion | W | 6.6 | 6.6 | 6.6 | 17.8 | 17.8 | 17.8 | 12.7 | 4.3 | 6.7 |
| | H | 5.2 | 5.2 | 5.2 | 21.5 | 21.5 | 21.5 | 10.1 | 4 | 1.9 |
| | L | 4.4 | 4.4 | 4.4 | 16.2 | 16.2 | 16.2 | 11.3 | 5.9 | 4.3 |
| | P1 | 11 | 11 | 11 | 34 | 34 | 34 | 24 | 10.2 | 11 |
| | Aspect ratio | 0.79 | 0.79 | 0.79 | 1.21 | 1.21 | 1.21 | 0.80 | 0.93 | 0.28 |
| Pixel | A | 42.5 | 42.5 | 297.0 | 297.0 | 65.2 | 42.5 | 42.5 | 297.0 | 42.5 |
| | B | 91.5 | 91.5 | 794.3 | 794.3 | 176.0 | 91.5 | 91.5 | 794.3 | 91.5 |
| | P2 | 157.5 | 157.5 | 932 | 932 | 242 | 157.5 | 157.5 | 932 | 157.5 |
| P2/P1 | | 14.32 | 14.32 | 84.73 | 27.41 | 7.12 | 4.63 | 6.56 | 91.4 | 14.32 |
| Moiré | | ◉ | ◉ | ◉ | ◉ | ○ | X | X | ◉ | ◉ |
| Rainbow | | ◉ | ◉ | ○ | ◉ | ◉ | ◉ | ◉ | X | ◉ |
| Relative diagonal contrast ratio | | ○ | ○ | ○ | ○ | ○ | ○ | ○ | ○ | X |

As shown in Table 1, the liquid crystal display apparatus according to the present invention did not generate Moiré and rainbow spots in an operation state, thereby providing a good external appearance. In addition, the liquid crystal display apparatus according to the present invention had a good diagonal contrast ratio.

By contrast, the liquid crystal display apparatuses of Comparative Examples 1 and 2 having a P2/P1 value of less than 7 in Equation 1 had a problem of observation of the Moiré. The liquid crystal display apparatus of Comparative Example 3 having a P2/P1 value of greater than 85 in Equation 1 had a problem of observation of rainbow spots. The liquid crystal display apparatus of Comparative Example 4 manufactured through adjustment in P2/P1 of Equation 1 and height H of the patterned portion exhibited insufficient improvement in diagonal contrast ratio.

While some embodiments have been described herein, it is to be understood that various modifications, changes, alterations, and equivalent embodiments can be made by those skilled in the art without departing from the spirit and scope of the invention.

What is claimed is:

1. A liquid crystal display apparatus comprising a liquid crystal panel and a viewer-side polarizing plate stacked on a light exit surface of the liquid crystal panel,
wherein the viewer-side polarizing plate comprises a patterned layer comprising a first resin layer and a second resin layer having different indexes of refraction; and a patterned portion comprising multiple engraved optical patterns and a flat section between adjacent engraved optical patterns of the multiple engraved optical patterns is formed at an interface between the first resin layer and the second resin layer, wherein the liquid crystal display apparatus satisfies the following Equation 1 and the engraved optical patterns have an aspect ratio of 0.3 or more:

$$10 \leq P2/P1 \leq 30,$$

where P1 is a pitch (unit: μm) of the patterned portion, and P2 is a width (unit: μm) of a pixel of the liquid crystal panel in a same direction as a maximum width of an engraved optical pattern of the adjacent engraved optical patterns, the pitch of the patterned portion being defined as a sum of the maximum width of the engraved optical pattern and a maximum width of the flat section, wherein, in Equation 1, P2 is from 150 μm to 950 μm.

2. The liquid crystal display apparatus according to claim 1, wherein the engraved optical patterns are arranged in a same direction as a short-side direction of the liquid crystal panel.

3. The liquid crystal display apparatus according to claim 2, wherein P2 is the sum of a width of a unit pixel of one pixel in a longitudinal direction of the unit pixel and a width of a black matrix in a longitudinal direction thereof.

4. The liquid crystal display apparatus according to claim 1, wherein the engraved optical patterns are arranged in a same direction as a long-side direction of the liquid crystal panel.

5. The liquid crystal display apparatus according to claim 4, wherein P2 is the sum of the sum of widths of unit pixels of one pixel in a transverse direction of each unit pixel and widths of three black matrices in a transverse direction thereof.

6. The liquid crystal display apparatus according to claim 1, wherein the pixel is a pixel assembly comprising three unit pixels consisting of a red unit pixel, a green unit pixel, and a blue unit pixel, and black matrices each separating a corresponding unit pixel from other unit pixels.

7. The liquid crystal display apparatus according to claim 1, wherein the liquid crystal panel comprises multiple pixels and the multiple pixels are arranged in a long-side direction and a short-side direction of the liquid crystal panel, respectively, such that a red unit pixel, a green unit pixel, and a blue unit pixel are repeatedly arranged in the stated order in the long-side direction, and each of red unit pixels, green unit pixels, or blue unit pixels are arranged alone in the short-side direction.

8. The liquid crystal display apparatus according to claim 1, wherein, in Equation 1, P1 is from 7 μm to 50 μm.

9. The liquid crystal display apparatus according to claim 1, wherein the engraved optical patterns are arranged in a same direction as a light absorption axis of the polarizer.

10. The liquid crystal display apparatus according to claim 1, wherein the engraved optical patterns have an N-gonal cross-section, N being an integer of 3 to 10, or a cross-section having a curved side surface.

11. The liquid crystal display apparatus according to claim 1, wherein the maximum width of the engraved optical pattern is from 30% to less than 100% of the pitch of the patterned portion.

12. The liquid crystal display apparatus according to claim 1, wherein the patterned portion has a constant P1 and the adjacent engraved optical patterns have a same maximum width.

* * * * *